Patented Aug. 25, 1942

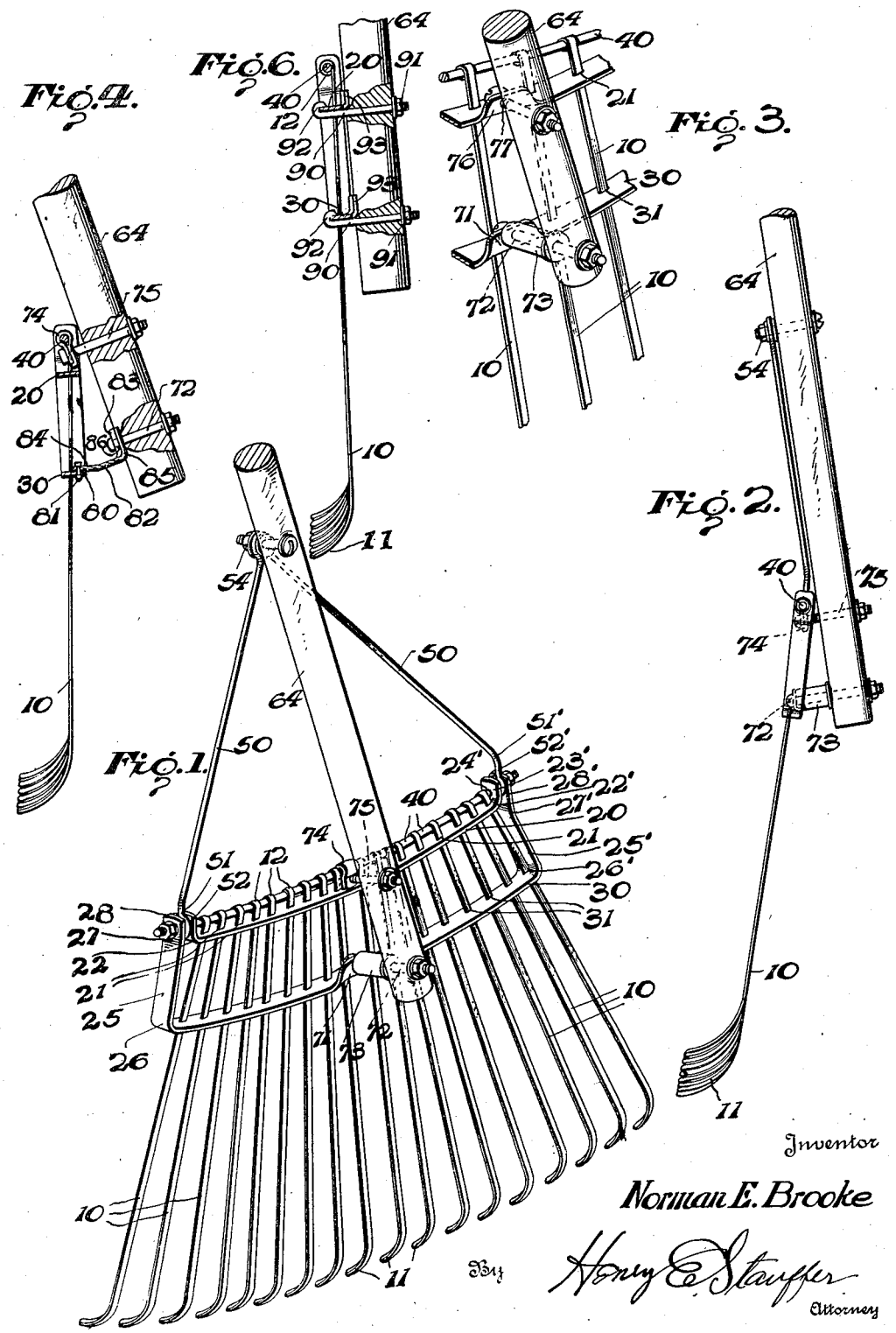

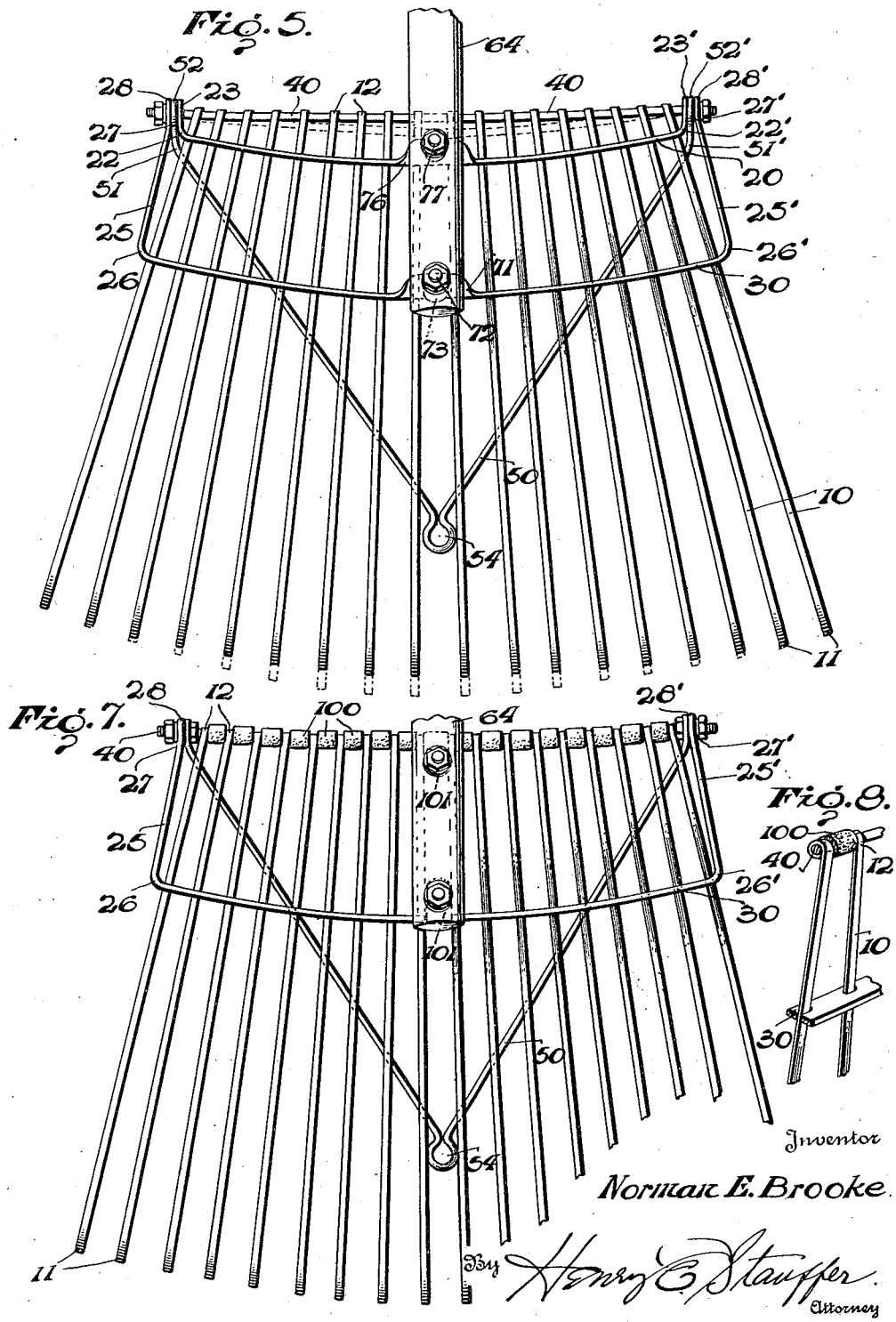

2,294,157

UNITED STATES PATENT OFFICE 2,294,157

RAKE

Norman E. Brooke, Washington, D. C.

Application December 5, 1941, Serial No. 421,818

16 Claims. (Cl. 56—400.17)

This invention is in hand rakes of the so-called broom type.

One of the objects of the invention is to provide a rake which is light in weight, strong in construction, and flexible and easy to handle; but which, at the same time, will stand the rough usage to which implements of this sort are usually subjected.

Another object of the invention is to construct a rake in such a manner that certain of the elements may be folded upon each other to facilitate packaging for shipment.

A further object is to produce a rake in which the rake head thereof is rigidly held at a definite and fixed angle with respect to its handle.

As a still further object, the invention contemplates a special arrangement of bridles, tines and cooperating elements, whereby a slight longitudinal movement of the tines in the bridles is possible, thus producing a very flexible and efficient construction.

Fig. 1 is a perspective view of one form of the rake, with the handle broken away;

Fig. 2 is a side elevation of the structure shown in Fig. 1;

Fig. 3 is a detail of a form of the invention somewhat different from that shown in Figs. 1 and 2;

Fig. 4 is a side elevation of the rake, showing a modified means for securing the front bridle of the rake head to the handle;

Fig. 5 is a plan view of a rake head, showing its bracing member folded over against the tines, and illustrating also the longitudinal movement of the tines possible with this construction;

Fig. 6 shows a modification, in which the rake head is attached directly to the handle by suitable fastening means, so that the head and the handle stand in parallel planes;

Fig. 7 is a plan view of a modified form of rake head construction; and

Fig. 8 is a fragmentary perspective view of the tines and their mounting in the form of the invention shown in Fig. 7.

Referring to Figs. 1 and 2, the body of the rake comprises flexible tines 10, and holders therefor or bridles 20 and 30. The tines, of which there may be any desired number, have their forward ends curved, as at 11, to form gathering points, and their rear ends provided with holding features, here shown as eyes 12, by means of which the tines are secured in position.

Several supports or bridles may be used, but only two are here shown. The bridles may be of any suitable material, and may be constructed in various ways. In Figs. 1 and 2, each bridle is made of an independent strip of metal.

The rear bridle 20 is provided with a series of spaced apart tine openings or slots 21, and the front bridle 30 is provided with a similar series of tine openings or slots 31, equal in number to, but spaced somewhat farther apart than, the openings 21 in the rear bridle 20.

The bridles 20 and 30 are shown curved, and preferably form arcs of approximately concentric circles; but this form is not of the essence of the invention, and other shapes may be used.

Across the rear bridle, and mounted in a manner to be described further, is a somewhat flexible and elastic rod 40, which passes through the eyes 12 of the tines 10.

The bridle 20 is bent or otherwise formed at the points 22, 22', to provide ends 23, 23', which are brought to positions approximately parallel to each other and to the median line of the rake head and rake handle. The end 23' is provided with an opening 24', and the end 23 with a similar opening (not shown).

Connectors 25, 25', secure together the ends of the bridles 20 and 30. While these connectors may be independent parts, they are shown as formed by bending the forward bridle 30 at the points 26, 26', until 25, 25' take positions approximately radial to the circles of which the bridles 20 and 30 are arcs. However, the exact form is not vital, and the connectors may be made to assume any other practicable formation and position. It is only essential that they extend between the forward bridle and the rear bridle. The ends of the connectors 25, 25', are bent at points 27, 27', until the portions 28, 28' stand approximately parallel to, but slightly spaced from, the extensions 23, 23' of the bridle 20. The portions 28, 28' are both provided with holes (not shown), similar to the hole 24' in the end portion 23 of the bridle 20. A fastening rod 40 is passed through these openings, and is provided at its ends with securing devices, as the common nuts shown.

A brace 50 is provided, for staying the rake head against lateral displacement with respect to the handle. This brace 50 has two branches, the branches being bent at 51, 51', to form the eyes 52, 52', which are so formed as to bring them to positions approximately parallel to the ends 23, 28, and 23', 28', respectively, between which they are secured on the rod 40.

The brace 50 is provided with some means, as the eye 54, at or about its middle point, by which it may be secured to the rake handle 64 in some convenient manner.

Since the brace is pivoted on the rod 40, between the parallel bridle ends 23, 28, on the one side, and the similar bridle ends 23', 28', on the other side, it is easily possible to fold the brace 50 over until it lies against the tines, either above or below the same. As shown in Fig. 5, the brace is beneath the tines. This feature is important, for it is the general practice to ship implements of this type with the heads and handles in separate packages. And by mounting the brace as described, and folding the parts together before shipment, the rake heads may be much more readily and inexpensively packaged and shipped.

Should it be found desirable to package the rakes complete, rather than the heads and handles separately, the form of mounting of Figs. 1, 2 and 4 offers great advantage in this respect. As shown in these figures, the rear portion of the rake head is secured to the handle by means of a swivel 74, provided with two holes at approximately right angles to each other. The rod 40 passes through one hole, and the bolt 75 through the other and then through the handle 64. With this construction, the bolt 72, which secures the forward bridle 30 to the handle, may be left unfastened, and the entire rake head turned back, pivoting on the rod 40 through the swivel 74 and the eyes 52, 52' of the brace 50, until it lies flat against the handle. To prepare the rakes for sale after shipment, it is only necessary to swing the rake head forward to its normal position, and secure the bolt 72.

The rake head proper may be rigidly set at a definite angle with respect to its handle, as in Figs. 1, 2 and 4; or it may be fixed in the plane of the handle, or in a plane parallel thereto, as shown in Fig. 6. The angular relationship is very desirable for some purposes; and this may be secured by using a spacer 73 on the bolt 72. A shorter spacer, or none at all, is used for the rear bolt 75.

The bolts for fastening the rake head to the handle may be secured to the head in various ways. In Fig. 1, the front bridle 30 is provided with a lug or ledge 71, which may be formed from the material of the bridle itself, or which may be made as a separate bracket, and welded or otherwise held on the bridle. The fastening bolt 72 is simply passed through a hole in the bracket 71, through a suitable spacer 73, and through the rake handle 64.

In Fig. 3, the mounting of the forward bridle is substantially like that of Fig. 1; but the rear portion of the rake head is secured to the handle by bolting the bridle thereto rather than the holding rod 40. As shown, Fig. 3, the rear bridle is provided with a ledge or flange 76, substantially like the lug 71 on the forward bridle, already described. The securing bolt 77 is passed through the flange 76—a suitable hole being formed therein—and then through the handle. As mentioned above, a spacer may or may not be used, as desired.

The lugs or brackets 71 and 76 may both face in the same direction, or they may face in opposite directions, this being a matter of choice.

The last mentioned construction presents features not found in the form of mounting shown in Figs. 1 and 2. These result especially from making the rod 40 flexible, and mounting the tines 10 somewhat freely in the bridles 20 and 30. As material is gathered by the rake of Figs. 3 and 5, there is, of course, more or less pull on the tines. The construction referred to will permit the rod 40 to bend or flex more or less, and the tines to slip in the bridles through the openings 21, 31. The rod thus bent is shown in Fig. 5 in broken lines, and the displaced tines likewise are shown in broken lines in the figure. When the pull on the tines is lessened, of course, the rod 40 will return to its normal position, and the tines move in the bridles to their normal or full line positions. This movement, while limited, nevertheless adds much to the flexibility and ease of action of the rake. But more important, the points where the tines 10 bend or flex as they pass through the openings 31 of the bridle 30 are varied. As the tines sometimes break at these points, the shifting of such points, as described, prolongs the life of the tool.

A somewhat different form of spacing and bridle supporting means is shown in Fig. 4. Here the handle 64, tines 10, bridles 20 and 30, and holding rod 40 are all as in the forms already described. But the front bridle support is different. More particularly, it is a brace or bracket, secured to the bridle 30 at 81, by welding, riveting or otherwise. It has a portion 82 extending from the bridle, and another portion 83, which is disposed at an angle to the portion 82, so as to lie along the plane of the rake handle 64. The portion 83, which is actually secured to the handle 64, must be offset either at 80 or 85, or both, so that 83 bears the proper angular relationship to the handle. The ledge or section 83 is provided with a hole 86 for the bolt 72.

In Fig. 6, I have shown a rake in which the head is secured to the handle, not at an angle, as in the other figures, but in a plane parallel to the plane of the handle 64. Tines 10, having gathering ends 11, and holding eyes 12, are provided, as in the other forms. A rear bridle 20 and a front bridle 30 are substantially the same as the bridles thus numbered in Figs. 1 and 2. The rake head is attached directly to the handle by hooks or similar fastening devices 90, 90. Each has one end threaded to receive a nut 91, and the other end provided with an overhanging ledge 92 which is engaged directly under the bridle secured by it. Seats or rests 93, 93, for the handle are provided. These may be of any practicable character. As shown in Fig. 6, they are similar to the ledges 71, 76, of Fig. 3. These rests may be formed from the material of the bridles, as are the ledges 71 and 76, or they may be lugs welded or riveted to the bridles.

To mount the head on the handle, it is only necessary to place the head against the handle, positioning the handle on the rests 93, 93, place a ledge 92 of a hook 90 under each of the bridles 20 and 30, pass the threaded portions of the hooks through the handle, and draw down the nuts 91. This makes a secure and simple fastening means for holding the rake head directly to the handle.

In Figs. 7 and 8, I have shown a rake head wherein the rear bridle is omitted, and wherein elastic spacers are used to position the tines. In this form, the tines 10 have gathering ends 11, and holding eyes 12, as in the other forms. The front bridle 30 is provided with slots or openings similar to the slots 31 of Fig. 1, and this bridle is bent at the points 26, 26', to form the connectors 25, 25', and also at 27, 27', to form the properly shaped ends 28, 28'. As stated above, there is no rear bridle, such as 20 in Figs. 1 and 5. Instead, the rear holding rod 40 which is passed through the eyes 12 in the tines 10, and then directly through the ends 28, 28' of the connectors 25, 25'. Nuts secure the ends of the rod 40. To space the eyes 12 of the tines properly, as well as to secure an elastic construction and quiet operation, rubber spacers 100 are positioned between the eyes of the tines.

The head is mounted on the handle in any desired way, as by the bolts 101, 101; and the brace 50 is mounted on the rod 49 substantially as in the other figures. It is here shown folded over, like the brace in Fig. 5.

It is apparent that rubber spacers can be used also between the tines on the front bridle.

Having thus described my invention, what I claim is:

1. In a rake, the combination of a handle, a rake head including tines in overlapping relation to the end of the handle, means rigidly connecting the rear of the rake head to the handle at a point spaced from said end, and spacing means rigidly connecting an intermediate portion of the rake head to said end of the handle, so that the rake head stands at an acute angle with respect to the handle.

2. In a rake, the combination of a handle, a rake head including tines and a bridle member in overlapping relation to one end of the handle, spacing means connecting the rear of the rake head to the handle at a point spaced from said end and spacing means of greater length connecting the bridle member to the handle in fixed but greater spaced relation thereto than the rear of the rake head, so that the rake head is held at an acute angle with respect to the handle, substantially as described.

3. In a rake, the combination of a handle, a rake head including tines, a front bridle, and a rear bridle in overlapping relation to one end of the handle, spacing means connecting the rear bridle to the handle at a point spaced from said end, and spacing means for rigidly connecting the front bridle to the handle in fixed but greater spaced relation thereto than the rear bridle, so that the rake head is held on the handle at an acute angle with respect thereto, substantially as described.

4. In a rake, the combination of a handle, a rake head including tines, a bridle member, and a tine holding rod in overlapping relation to one end of the handle, spacing means connecting the tine holding rod to the handle, and spacing means of greater length connecting the bridle member to the handle so that the rake head is held on the handle at an acute angle with respect thereto, substantially as described.

5. In a rake, the combination of a handle, a rake head including tines, and a front bridle having a handle seat thereon, and a rear bridle having a handle seat thereon, in overlapping relation to one end of the handle means rigidly holding the handle to the seat on the front bridle, and means rigidly holding the handle to the seat on the rear bridle.

6. In a rake, a handle, a rake head in overlapping relation to the handle and including a rear bridle having tine orifices therein and provided with a fastening lug near the middle thereof, a front bridle also having tine orifices therein and also provided with a fastening lug near the middle thereof, connectors between the bridles, tines in the bridles, a transverse rod for holding the rear ends of the tines, means passing through the handle and the lug on the rear bridle for securing the rear part of the rake head to the handle, and means passing through the handle and the lug on the front bridle for securing the front part of the head to the handle.

7. A rake head comprising a bridle member, tines supported thereby, a holding rod for securing the tines in the bridle member, and a brace pivoted on the holding rod and adapted to rotate through substantially a full circle, so that the brace and the other elements of the rake head may be folded together by rotating the brace and the other elements relative to each other.

8. A rake head comprising a bridle member, tines supported thereby, and a pivoted brace adapted to rotate through substantially a full circle, so that the brace and the other elements of the rake head may be folded together by rotating the brace and the other elements relative to each other.

9. In a rake, the combination of a handle, a rake head comprising tines, a bridle through which the tines are passed, and a rod for supporting the rear ends of the tines, a swivel on the rod, means for securing the swivel to the handle, and means for detachably securing the bridle to the handle, whereby upon detaching the bridle from the handle, the rake head can be rotated on the swivel until the head lies adjacent the handle.

10. In a rake, the combination of a handle, a rake head in overlapping relation to one end of the handle, a swivel on the rear portion of the rake head, means holding the swivel to the handle, and detachable means rigidly connecting the forward portion of the rake head to the handle, so that upon detaching the connecting means the head can be rotated on the swivel until it lies adjacent the handle.

11. A rake head comprising tines, a rear bridle for supporting the tines the ends of the said bridle being approximately parallel to each other and to the median line of the rake head, a front bridle for supporting the tines, connectors for the bridles one at either end thereof, the ends of the connectors being arranged approximately parallel to each other and to the ends of the rear bridle, a holding rod for securing the tines in the head, and a brace having its intermediate point adapted to be secured to a rake handle and having its ends spread apart and positioned on the holding rod and parallel to the ends of the rear bridle and the connectors, so that the brace may be folded over against the tines.

12. In a rake, a handle, a rake head comprising spring tines having gathering ends, a bridle having tine orifices in which the tines are supported for free movement, the tines in use normally bending primarily at their points of contact with the said bridle, and an elastic holding rod for supporting the rear ends of the tines, and means for securing the rake head to the handle, whereby in the use of the rake when there is a pull on the tines, the holding rod may yield forwardly and the tines move somewhat through the orifices in the bridle, thus shifting the points at which the tines primarily bend.

13. In a rake, a handle, a rake head comprising spring tines having gathering ends, a front bridle having tine openings therein through which the tines pass freely, a rear bridle also having tine openings through which the tines pass freely, the tines in use normally bending primarily at their points of contact with the said front bridle, and an elastic holding rod behind the rear bridle for supporting the rear ends of the tines, and means for securing the rake head to the handle, whereby in the use of the rake when there is a pull on the tines, the holding rod may yield forwardly and the tines move somewhat through the orifices in the bridles, thus shifting the points at which the tines primarily bend.

14. A rake head comprising a plurality of spring tines each having a curved forward end and a securing means on its rearward end, a forward and a rear bridle for the tines of spaced apart arcs of approximately concentric circles perforated to receive the tines with an easy fit, the perforations of the front bridle being spaced apart farther than the perforations of the rear bridle so that the tines when mounted in the bridles will spread at their outer ends, the tines in use bending primarily at their points of contact with the forward bridle, connectors for securing together the ends of the bridles, an elastic rod securing the connectors together and engaging with the securing means of the tines, whereby in the use of the rake head when there is a pull on the tines, the holding rod may yield forwardly and the tines move somewhat through the orifices in the bridles, thus shifting the points at which the tines primarily bend.

15. A rake head comprising a bridle member, tines supported thereby, a holding rod for securing the rear portions of the tines in the bridle member, and elastic members on the holding rod for properly spacing the rear portions of the tines each from the other.

16. A rake head comprising a bridle member, tines supported thereby, a holding rod for securing the rear portions of the tines in the bridle member, and elastic members on the holding rod one between each two of the tines for properly spacing the same each from the other.

NORMAN E. BROOKE.